US012456445B2

(12) United States Patent
Myers

(10) Patent No.: US 12,456,445 B2
(45) Date of Patent: Oct. 28, 2025

(54) PEDAL MANAGEMENT SYSTEM

(71) Applicant: Robert Myers, Baltimore, MD (US)

(72) Inventor: Robert Myers, Baltimore, MD (US)

( * ) Notice: Subject to any disclaimer, the term of this patent is extended or adjusted under 35 U.S.C. 154(b) by 838 days.

(21) Appl. No.: 17/718,487

(22) Filed: Apr. 12, 2022

(65) Prior Publication Data

US 2023/0326440 A1 Oct. 12, 2023

(51) Int. Cl.
*G10H 1/34* (2006.01)
*G10G 5/00* (2006.01)
*G10H 1/00* (2006.01)

(52) U.S. Cl.
CPC ............... *G10H 1/348* (2013.01); *G10G 5/00* (2013.01); *G10H 1/0066* (2013.01); *G10H 2220/265* (2013.01)

(58) Field of Classification Search
CPC ................. G10H 1/348; G10H 1/0066; G10H 2220/265; G10G 5/00
USPC ............................................................ 84/746
See application file for complete search history.

(56) References Cited

U.S. PATENT DOCUMENTS 4,488,468 A * 12/1984 Peterson .................. G10H 1/34 84/DIG. 25
6,215,055 B1 * 4/2001 Saravis .................. G10H 1/348 84/746
6,538,185 B1 * 3/2003 Stratton ................. G10H 1/348 84/444
6,723,909 B1 * 4/2004 Hooper, II ............... G10H 1/32 84/177

(Continued)

FOREIGN PATENT DOCUMENTS

AU 2013270633 A1 * 12/2014 ............. G10H 1/348
DE 202010011970 U1 * 12/2010 ............. G10H 1/348

(Continued)

*Primary Examiner* — Christina M Schreiber

(74) *Attorney, Agent, or Firm* — U Maryland Carey School of Law

(57) ABSTRACT

The invention relates to a pedalboard system for musical instruments. The pedalboard consists of a main board comprising a main board base and a cover, and a plurality of pedal bases. The main board base contains a power supply which distributes power throughout a circuit comprising of female connection parts that extend into a plurality of openings in the mainboard cover. The openings act as pedal base attachment regions where, at each, a female connection part is accessible. The number of pedal attachment regions corresponds to the maximum number of pedals that can attach to the pedalboard. Each pedal base has a male connection part extending from the underside of the pedal base that allows it to attach to the female connection part on the mainboard base through the pedal attachment region on the main board cover. Each pedal base also comprises a pair of connection cables on the top side extending from the wire housing that enables the pedal base to connect to inputs and outputs of a musical pedal. When a pedal attaches to a pedal base, and the pedal base connects to the main board, the pedal is incorporated into the circuit of the main board. The pedalboard system enables pedals to easily detach, attach, and rearrange across the pedalboard to meet the user's needs.

11 Claims, 5 Drawing Sheets

(56) References Cited

U.S. PATENT DOCUMENTS

| | | | | |
|---|---|---|---|---|
| 7,005,571 B1 * | 2/2006 | Groff | G10H 1/0066 84/645 |
| 8,614,385 B2 * | 12/2013 | McKinney | G10H 1/348 84/453 |
| 10,008,192 B2 * | 6/2018 | Kreifeldt | G10G 5/00 |
| 10,192,536 B1 * | 1/2019 | Jia | G10H 1/348 |
| 10,380,984 B1 * | 8/2019 | Calder | G10H 1/348 |
| 10,395,631 B1 * | 8/2019 | Boxberger | G10H 1/348 |
| 10,565,971 B2 * | 2/2020 | Wilfer | G10H 1/34 |
| 10,657,940 B1 * | 5/2020 | Calder | G10H 1/32 |
| 10,832,644 B2 * | 11/2020 | Fiden | G10H 1/348 |
| 10,867,590 B1 * | 12/2020 | Miller | G10H 1/0008 |
| 10,909,957 B2 * | 2/2021 | Trifilio | G10H 1/348 |
| 11,107,450 B2 * | 8/2021 | Chickneas | H04H 60/04 |
| 11,790,878 B2 * | 10/2023 | Trifilio | G10H 1/0008 84/746 |
| 2011/0271821 A1 * | 11/2011 | McKinney | G10H 1/348 84/746 |
| 2013/0327201 A1 * | 12/2013 | Urry | G10H 1/348 84/626 |
| 2014/0077723 A1 * | 3/2014 | Ahern | H05B 45/20 315/291 |
| 2016/0293151 A1 * | 10/2016 | Mayo | G10H 1/0058 |
| 2017/0140744 A1 * | 5/2017 | Kreifeldt | G10H 1/348 |
| 2017/0256245 A1 * | 9/2017 | Abbate | G10H 1/348 |
| 2018/0151162 A1 * | 5/2018 | McKenzie | G10H 1/348 |
| 2018/0301131 A1 * | 10/2018 | Jashyn | G10H 1/348 |
| 2020/0251078 A1 * | 8/2020 | Stringham | G10G 5/00 |
| 2020/0388260 A1 * | 12/2020 | Chickneas | H04H 60/04 |
| 2023/0215408 A1 * | 7/2023 | Ivens | B65D 43/24 84/746 |
| 2023/0326440 A1 * | 10/2023 | Myers | G10H 1/348 84/746 |
| 2024/0212658 A1 * | 6/2024 | Reistrup | G10H 1/348 |

FOREIGN PATENT DOCUMENTS

| | | | | | |
|---|---|---|---|---|---|
| ES | 2412605 | B1 * | 4/2014 | G10H 1/348 |
| GB | 2544517 | A * | 5/2017 | G10H 1/0066 |
| KR | 20180103828 | A * | 9/2018 | G10G 5/00 |
| WO | WO-2018064459 | A1 * | 4/2018 | G10H 1/348 |
| WO | WO-2019143363 | A1 * | 7/2019 | G10H 3/186 |

* cited by examiner

PEDAL MANAGEMENT SYSTEM

FIELD OF INVENTION

The disclosed invention relates to a musical instrument pedal management system.

BACKGROUND

Many musicians produce their sound through audio manipulations. Many achieve their desired sound using effects pedals. Effects pedals are electronic devices that manipulate the sound of a musical instrument through audio signal processing. Effects pedals are commonly used with electronic instruments, but they can be used with any audio source. Frequently used effects pedals include those that may control dynamic effects such as volume pedals and compressors, distortion and overdrive, filters which may modify frequency ranges, modulators, pitch effects, and time effects.

Musicians use effects pedals when recording music and when recording live. Often the performance or recording will utilize multiple pedals at the same time to produce the desired sound. When combining multiple effects, the pedals are attached to each other. Pedals are connected using instrument cables. When many pedals are used, many instrument cables are required. Sometimes, each pedal needs a separate cable to attach to the power source and additional cables to attach to the adjacent pedals and the instrument. The number of cables and wiring required increases quickly as more pedals are used, which can get complicated and expensive.

Additionally, because musicians use pedals when performing and recording, the pedals are involved in frequent travel and repeated assembly/disassembly of a pedal management system may be required. To address this, many musicians use a pedalboard to organize their guitar pedals. A pedalboard is essentially a platform for organizing pedals. Pedalboards are utilized to reduce setup and teardown time, however assembling pedalboards often takes hours. While a pedalboard can improve organization, removing a pedal or reconfiguring the pedalboard takes time which subtracts from a band's playing time. Moreover, the pedal requirements of musicians vary by performance, so time is of the essence in reconfiguration. Guitar pedals are typically mounted to the pedalboard by hook and loop fasteners, or a similar attachment means. Alternatively, the pedals may be screwed into the pedalboard. Regardless, the current pedal board assemblies can still be cumbersome.

There is a clear need in the industry for a pedal management system that utilizes a limited amount of cabling to reduce disorganization, takes less time to build and repair, is less costly, and allows users to easily experiment with and alternate effects.

DETAILED DESCRIPTION OF THE DRAWINGS

The invention discussed herein is a modular musical instrument pedalboard system 1 that incorporates a single circuit throughout a main board. The single circuit includes wiring and a power supply. The circuit continues even if a pedal is removed, without requiring additional wiring (See FIG. 1*a*). The main board comprises a pin and socket module where a pedal base may attach to the pedalboard by connecting the male connection part to the female connection part thus incorporating the pedal base in the circuit. The desired pedal attaches to one of the pedal bases through connection cables extending from the pedal base and becomes a part of the circuit when attached. The desired pedals may be attached and easily removed and/or rearranged for quick assembly based on the user's preferences. The invention utilizes dynamic power distribution at the pedals from a single pedal power supply.

Figure 1A:
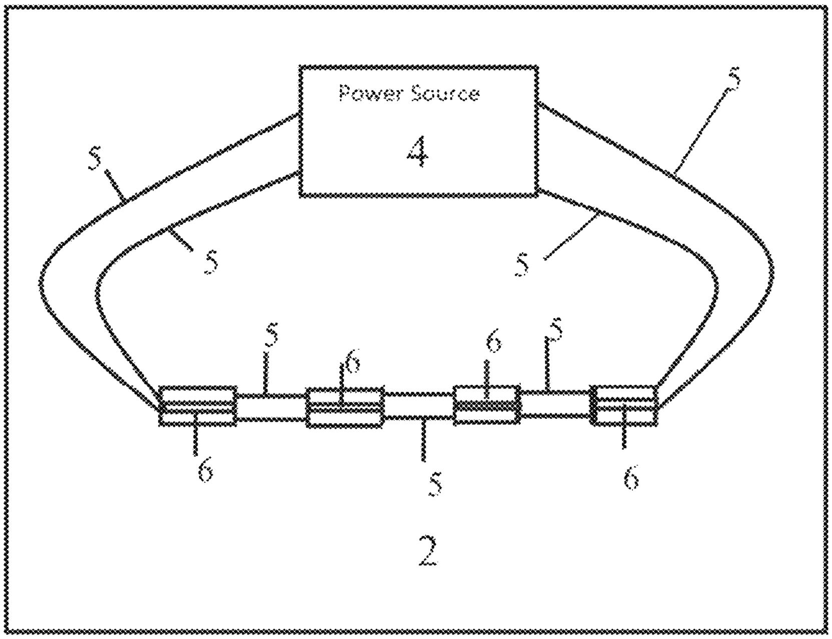
FIG. 1*a* is a top view of the main board base in accordance with an example embodiment of the present invention.

The embodiment in FIG. 1*a* shows a top view of the main board base 2. Inside the base 2 is a circuit comprised of a power supply 4, circuit wiring 5, and a plurality of female connection parts 6. The circuit wiring 5 provides reliable connection from a power supply to a plurality of female connection parts 6. The embodiment in FIG. 1*a* includes four female connection parts 6 but embodiments of the invention may include any number based on a user's needs.

Figure 1B:
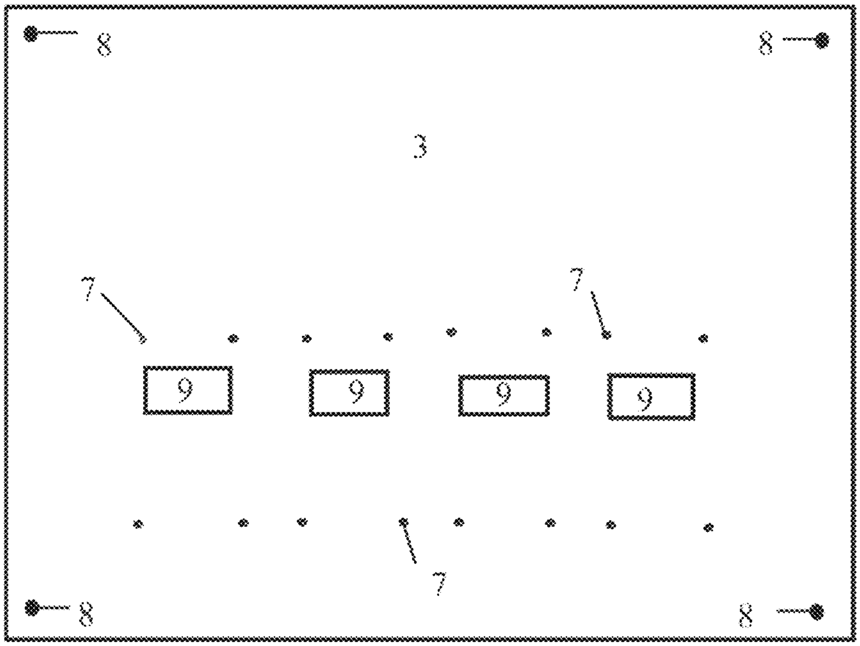
FIG. 1B is a top view of the main board cover in accordance with an example embodiment of the present invention.
Figure 3:
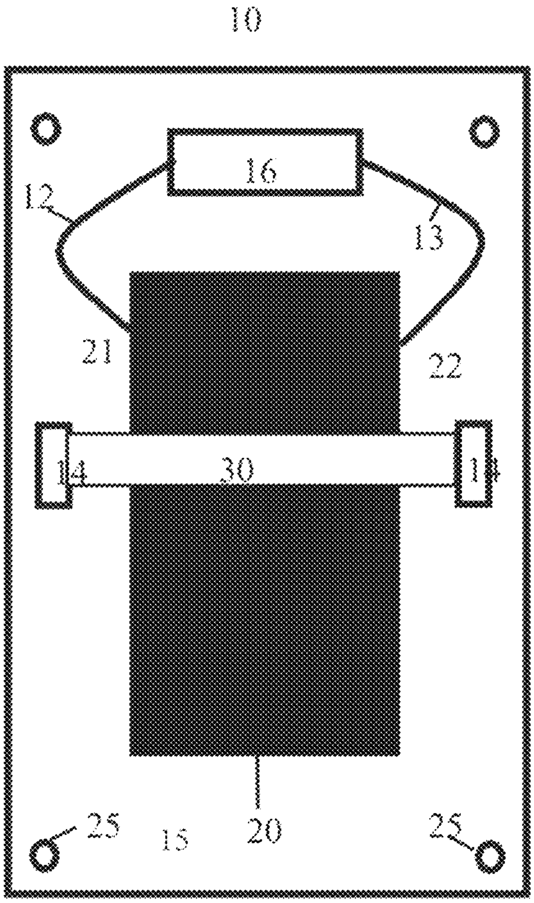
FIG. 3 is a top view of a pedal base with a pedal attached in accordance with an example embodiment of the present invention.

The embodiment in FIG. 1B shows a top view of the main board cover 3 without any pedal bases 10 or pedals 20 attached (see FIG. 3). The main board consists of two pieces, the base 2, and the cover 3. The base 2 is illustrated in FIG. 1*a*. In the disclosed embodiment the main board cover 3 attaches to the main board base 2 via a plurality of screws. The screws are not shown but the main board cover may include a plurality of threaded holes 8 for attachment to the main board base 2. The attachment means is not limited to threaded screws; the main board base and cover may be attached by any other suitable means known to persons of skill in the art.

The main board cover 3 includes a plurality of pedal attachment regions 9. At each pedal attachment region there is an opening in the cover that enables a pedal base to connect to the female connection part 6 of the main board base 2. In alternative embodiments, the opening may have a different shape. The number of pedal attachment regions 9 corresponds to the number of connection parts 6 on the complementary main board base 2. In this embodiment there are four connection parts 6 in the circuit of the main board base 2 so there are four pedal attachment regions 9 incorporated into the cover. Embodiments of the pedalboard may include any number of pedal attachment regions 9. The number of connection parts 6 and pedal attachment regions 9 correspond to the maximum number of pedals that can be attached to the pedalboard 1 in that configuration. The pedalboard 1 is configured in a way so that whatever attaches at the pedal attachment regions 9 on the main board cover 3, may be incorporated into the wiring 5 circuit of the pedalboard 1.

FIG. 1*b* also shows an embodiment comprising pedal base anchors 7 on the main board cover 3. Pedal base anchors 7 allow for a more secure connection between the main board cover 3 and the pedal base 10 by attaching to a plurality of holes 25 in the pedal base 10 (see FIGS. 2*a* and 2*b*). The pedal base anchors 7 may also reduce friction between the pedal base 10 and main board cover and in one embodiment may be located at each corner where a pedal base will attach to the main board cover 3. The invention is not limited to this attachment means; attachment can be achieved by any suitable means or not at all. In another embodiment, the pedal base 10 may allow for a semi-permanent connection to the main board cover 3. For example, in place of pedal base anchors, the main board cover 3 and pedal base 10 may comprise a plurality of threaded holes 25 wherein a plurality of screws attach the pedal bases 10 to the main board cover 3 via the threaded holes.

Figure 2A:
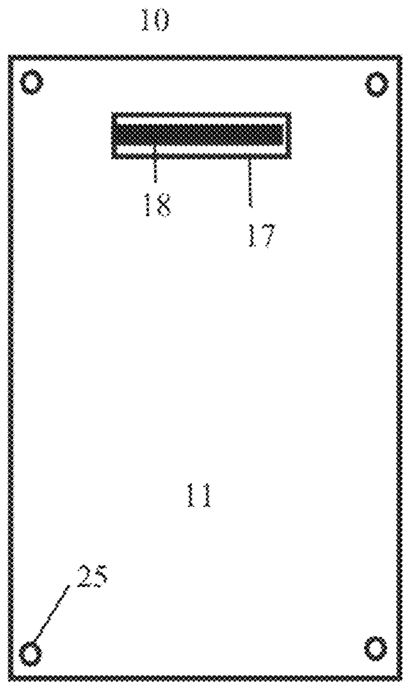
FIG. 2*a* is a bottom view of a pedal base in accordance with an example embodiment of the present invention.

The embodiment in FIG. 2*a* shows the bottom side 11 of a pedal base according to an embodiment of the invention. The bottom side 11 of the pedal base comprises a male connection part 18 extending from a rectangular opening 17 on the underside of the pedal base 11. The male connection part 18 is configured to attach to the female connection part 6 on the main board base, through the pedal attachment region 9 on the main board cover 3. The male connection part 18 is not configured to be specific to any specific pedal attachment region 9 on the main board cover 3 so that the order of the pedal bases 10 on the main board cover can be easily changed. The user will have the option of removing a pedal base 10 from one pedal attachment region 9 and reattaching the pedal base 10 to another pedal attachment region 9 without removing a pedal from the pedal base. Users may change pedal order for any number of reasons and the ability to easily detach and reattach these pedal bases can save time and costs on wiring.

Figure 2B:
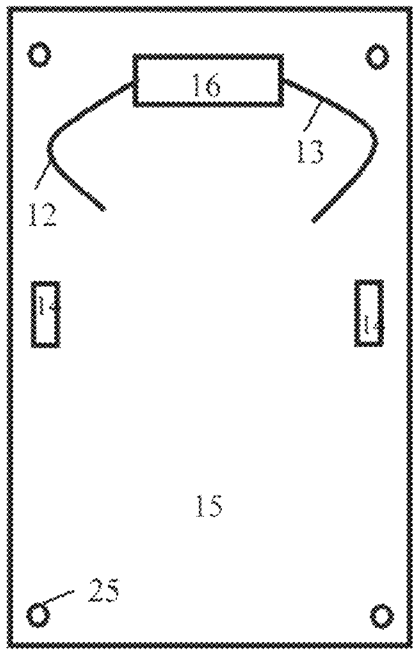
FIG. 2*b* is a top view of a pedal base in accordance with an example embodiment of the present invention.

FIG. 2*b* shows a top view 15 of a pedal base according to one embodiment of the invention without any pedal attached. The top side 15 of the pedal base includes a pedal base wire housing 16. The housing stores the male connection part 18 (seen in FIG. 2*a*). Within the housing is pedal base wiring that extends from the male connection part 18 to a pair of connection cables 12, 13 extending from the pedal base wire housing 16. The connection cables 12, 13 are those of any of suitable means to attach to the desired pedal. When attached to the connection cables 12, 13, a pedal receives power from the power supply and the pedal is incorporated into the circuit of the pedalboard. The top view 15 also shows strap holes 14 configured to accept a strap 30 (see FIG. 3) that secures a pedal 20 (see FIG. 3) to the pedal base 10.

The embodiment in FIG. 3 shows a pedal base 10 with a musical instrument pedal 20 attached. The connection cables 12, 13 are shown extending from the pedal base wire housing 16 to the input and output ports 21, 22 (respectively) of the pedal 20. In this embodiment a strap 30 is shown attaching the pedal 20 to the base 10 more tightly than without a strap. This embodiment is an example of what can be attached and detached to the main board without adding or exchanging any wires. The pedal base 10 with a pedal 20 attached can simply be removed by pulling the pedal base 10 out of the female connection part 18. This will remove the pedal from the circuit. The pedal base and pedal can be reincorporated into the circuit at another location on the circuit board. Additionally, the strap 30 can be removed, the connection cables 12, 13 detached, and the pedal 20 removed and a new pedal attached to the pedal base 10.

Figure 4:
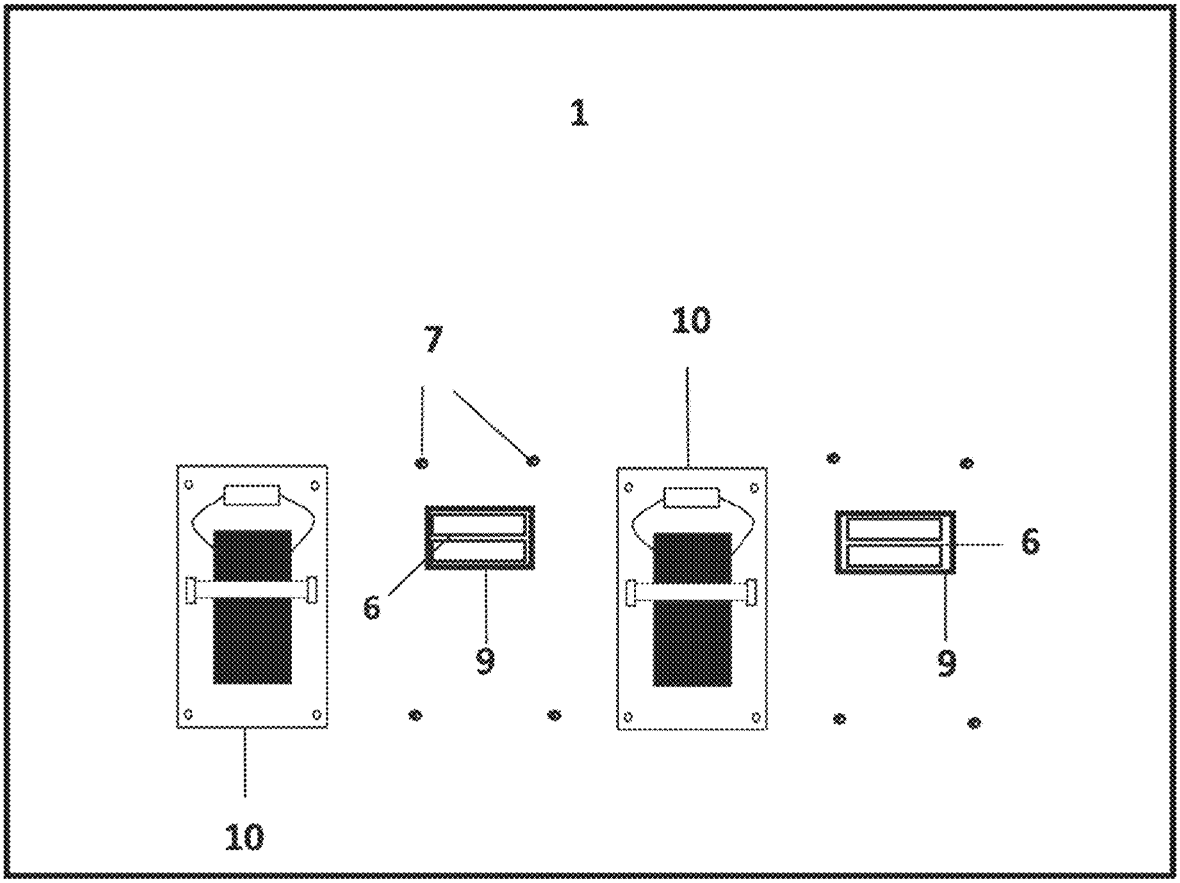
FIG. 4 is a top view of a pedalboard with two pedal bases attached in accordance with an example embodiment of the present invention.

FIG. 4 shows an example of a pedalboard 1 with two pedal bases 10 attached. In this embodiment there are two pedal attachment regions 9 on the cover 3 that have no pedal bases 10 attached. Note that even if pedal bases 10 with no pedals were attached to the open pedal attachment regions 9 on the pedalboard, the same output would be achieved.

Again, removing the pedal bases 10 and changing their order will only require detaching the male connection part 18 from the female connection part 6. This means the wiring 5 within the pedalboard 1 does not have to be altered. The connection cables 12, 13 do not have to be removed from the pedal 20 if it is still going to be a part of the pedalboard 1. The pedal base can just be placed in a different position.

An embodiment of the pedalboard system may allow for connection of additional inputs or outputs to the pedals. Additional inputs and outputs such as a stereo lines or expression pedals may attach to a pedal through further input 21 and output 22 ports on the pedal (see FIG. 3). The pedalboard system may be configured so that these additional inputs are incorporated into the circuit through the connection cables 12, 13 at the same connection part (i.e., female connection part 6) where the pedal 20 is attached.

Figure 5:
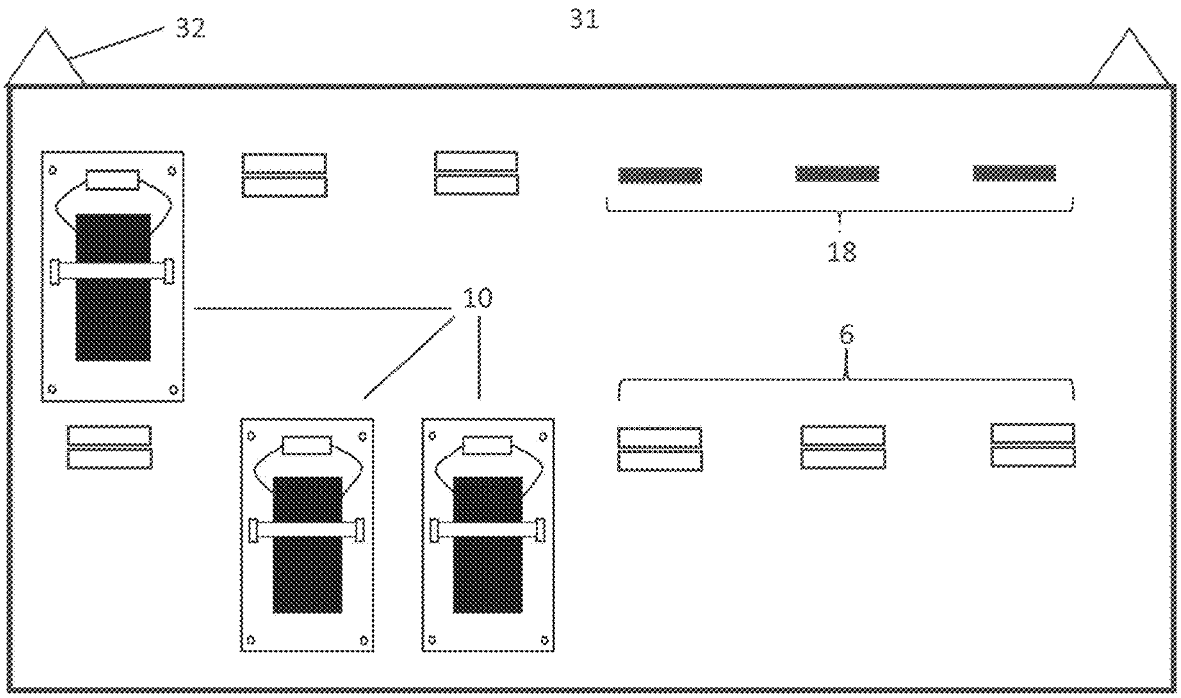
FIG. 5 is a lateral view of an embodiment of the pedalboard wall unit with attached pedals and open male and female connection parts.
Figure 6:
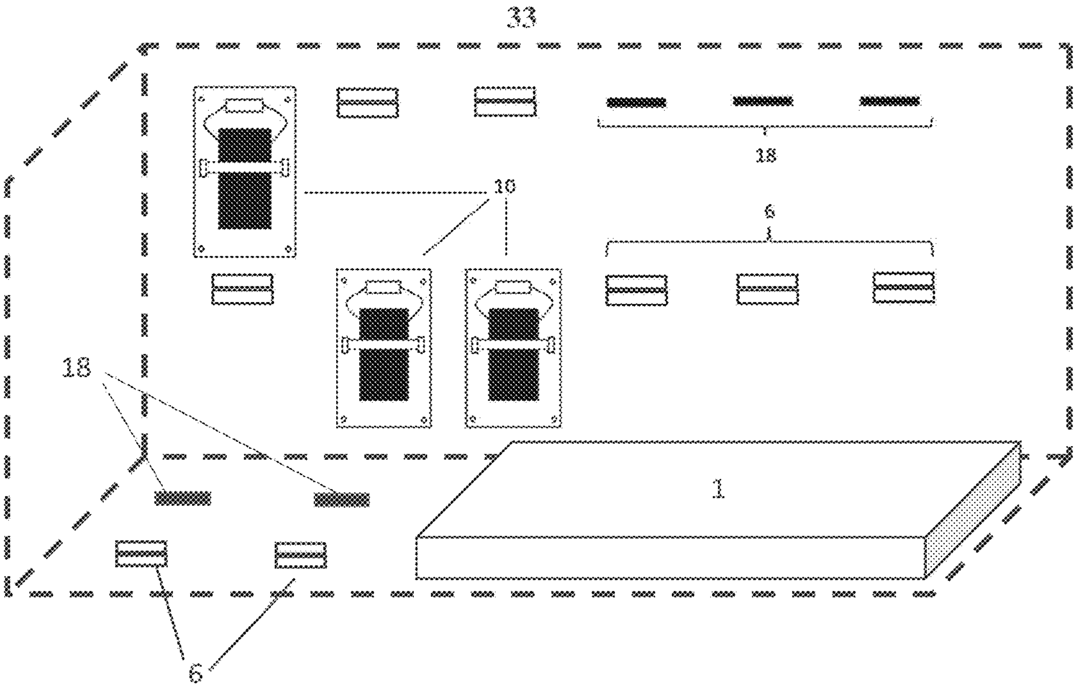
FIG. 6 is a cross-sectional view of an embodiment of the pedalboard storage box containing attached pedal units, a pedalboard system, and open male and female connection parts.

Another embodiment of the pedalboard system comprises a pedalboard construction kit. The pedalboard construction kit comprises the aforementioned pedalboard system 1, a pedalboard wall unit 31, and a storage box 33, as shown in FIG. 5. The pedalboard wall unit 31 and storage box 33 comprise a plurality of dummy male 18 and female connection parts 6 (see FIGS. 5 and 6) that allow for pedals which are not incorporated into the pedalboard circuit (see FIG. 1*a*) to be securely stored. The wall unit comprises means 32 for hanging or mounting the wall unit on to a wall such as the embodiment described in FIG. 5. The wall unit may be mounted to a wall by any suitable means 32, such as hooks or mounting brackets.

The foregoing description of the specific embodiments describes the general nature of the invention so that others can, by applying knowledge within the skill of the art, readily modify and/or adapt the invention for various specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments but should be defined only in accordance with the following claims and their equivalents.

The invention claimed is:

1. A modular pedalboard system for musical instrument pedals, the pedalboard system comprising:

a main board having;

a main board base, a power supply, a plurality of pedal attachment regions, each comprising a female connector disposed on the main board base and in a circuit with at least one other female connector and the power supply; and a plurality of pedal bases each of which are removably attachable to the main board proximate to one of the pedal attachment regions, each pedal base having:

a wire housing, a male connector extending from the wire housing and adapted to, by insertion into, mechanically and electrically connect to one of the plurality of female connectors thereby attaching the pedal base to the main board, and a plurality of connection cables electrically connected to the male connector and extending from the wire housing, said connection cables adapted to electrically connect a musical instrument pedal to the pedal base;

whereby a musical instrument pedal connected to a pedal base attached to the main board is powered by and incorporated into the circuit of the main board.

2. The pedalboard system of claim 1, wherein the main board further comprises a main board cover attached to and adapted to cover the main board base, the main board cover having an opening therethrough at each female connector location and through which a pedal base can be attached to the main board.

3. The pedalboard system of claim 2, wherein the main board cover comprises a plurality of anchors proximate to each pedal attachment region and each pedal base includes a mating set of openings adapted to engage with said plurality of anchors.

4. The pedalboard system of claim 2, wherein the main board cover comprises a plurality of threaded holes proximate to each pedal attachment region and each pedal base includes a mating set of threaded holes for attaching the pedal bases to the main board via a plurality of screws.

5. The pedalboard system of claim 1, wherein a pedal base further comprises a pair of strap holes adapted to anchor a strap holding an instrument pedal to a pedal base.

6. The pedalboard system of claim 1, wherein the plurality of connection cables comprise an input connection cable and an output connection cable adapted to connect to an input and output port, respectively, of a musical instrument pedal.

7. The pedalboard system of claim 6, wherein the plurality of connection cables further comprises an additional inputs connection cable and an additional output connection cable adapted to attach to an additional input and an additional output port, respectively, of a musical instrument pedal.

8. The pedalboard system of claim 1 further comprising:

a pedal storage wall unit adapted to store one or more pedal bases; and a pedal storage box adapted to store one or more pedal bases.

9. The pedalboard system of claim 8, wherein the wall unit comprises a plurality of dummy male and female connectors for attaching pedal bases.

10. The pedalboard system of claim 8, wherein the pedal storage wall unit includes a wall hanging means.

11. The pedalboard system of claim 8, wherein the pedal storage box comprises a plurality of dummy male and female connectors for attaching pedals.

* * * * *